Sept. 20, 1971 J. R. GRIFFITH 3,605,319
CONNECTOR FOR RELEASABLY SECURING A FISHING
LINE TO A WEIGHT LINE
Filed March 28, 1969
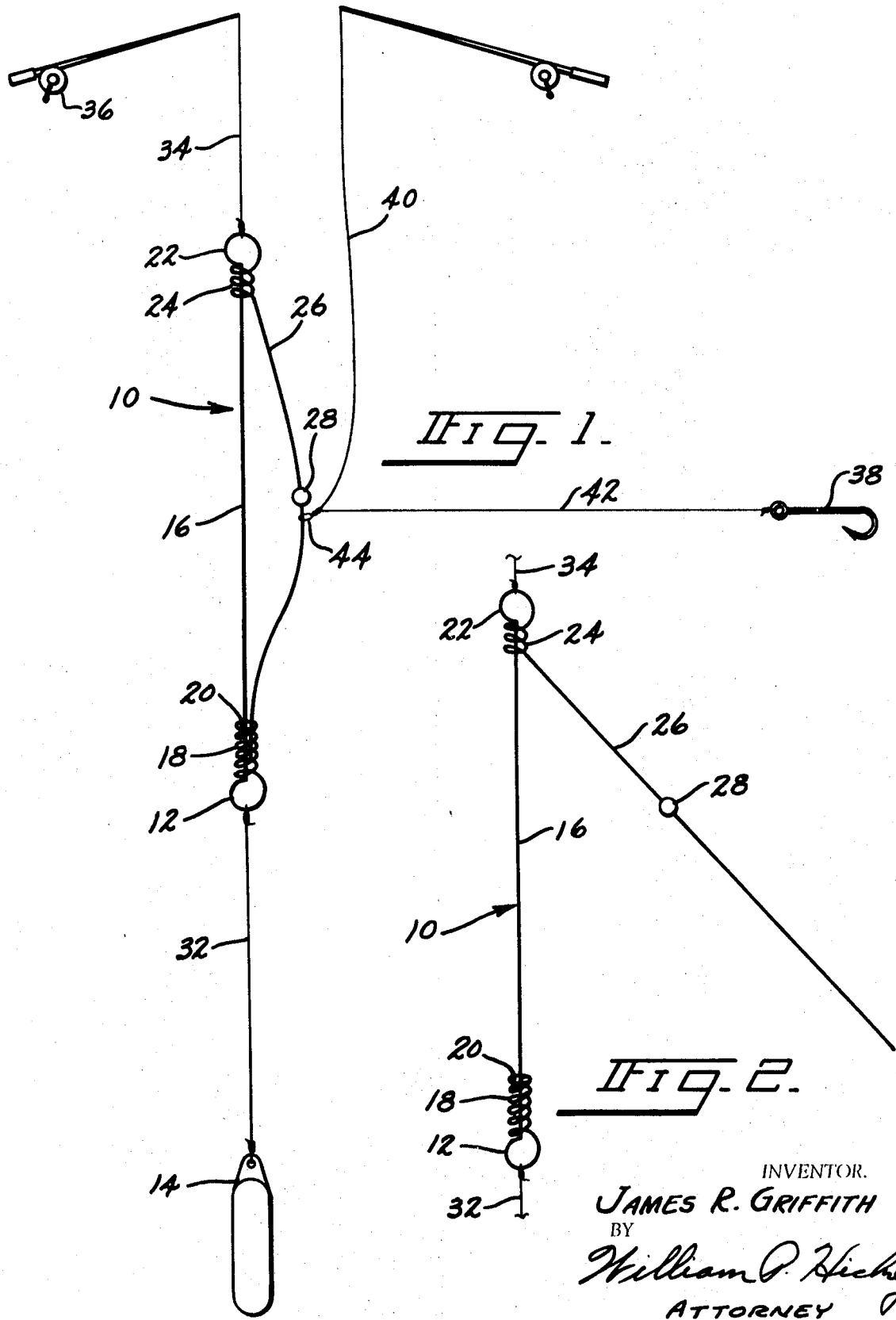
INVENTOR.
JAMES R. GRIFFITH
BY
William P. Hickey
ATTORNEY

United States Patent Office 3,605,319
Patented Sept. 20, 1971

3,605,319
CONNECTOR FOR RELEASABLY SECURING A FISHING LINE TO A WEIGHT LINE
James Robert Griffith, 1446 Melvin Drive,
Toledo, Ohio 43615
Filed Mar. 28, 1969, Ser. No. 811,552
Int. Cl. A01k 91/00
U.S. Cl. 43—43.12                                   8 Claims

ABSTRACT OF THE DISCLOSURE

A connection device for releasably securing a fish line to a weight line comprising a body portion interposed in the weight line and having an elongated, bow-shaped spring portion secured at its upper end to the upper end of the body portion. The spring portion has a lower free end engaged in a coil ring structure at the lower end of the body portion. An intermediate portion of the fish line is slidably secured to the spring portion by a loop in the fish line. The fish line can be released from the spring portion by either a generally upward or right-angular pull on the fish line, which pulls the free end of the spring portion from the coil ring, but is prevented from release therefrom by a generally downward pull on the fish line.

BACKGROUND OF THE INVENTION

It is known that some game fish, as for example, salmon and lake trout, confine themselves to certain narrow ranges of depth of water at various times of the year, which depth ranges may exceed 100 feet or more. It is impossible to maintain a lure at such depths, particularly when trolling, without having a sinker of considerable weight attached to the bait or fishing line, and this weight not only interferes with the sport of "playing" the fish once it is hooked, but may make it impossible to land the fish once it is hooked without breaking the fishing line. Numerous devices have been proposed heretofore for separating the sinker from the fishing line, but all of these devices with which I am aware, either drop the sinker so that it cannot be recovered, provide considerable structure immediately ahead of the bait which disturbs the fish, or involves coupling structure which cannot be quickly actuated by the fisherman.

An object of the present invention is the provision of new and improved means for releasably connecting a fishing line to a sinker line, which is not released by a downward strike of the fish, but is released by a rearward drag on the bait, or an upward pull by the fisherman.

Another object of the invention is the provision of a new and improved sinker support that includes a release mechanism to which the fishing line and bait line are attached and which is located in the line which supports the sinker.

A further object of the invention is the provision of a new and improved structure of the above described type which is simple in construction, reliable in its operation, and inexpensive to manufacture.

SUMMARY OF THE INVENTION

According to the invention, structure is provided for connecting a fishing line and a sinker line in such manner that a downward strike by the fish is resisted by the sinker line, whereas the connection between the two lines is released by either a rearward drag on the bait, or an upward pull by the fisherman. Normally a fish approaches a lure, either artificial or live, from the rear at a velocity that is greater than that of the lure, and then proceeds downwardly and forwardly. In one aspect of the invention, this strike is resisted by the sinker line so as to set the hook in the fish's mouth. Thereafter the fisherman, by reeling in his fishing line, releases the connection between the fishing line and the sinker line so that the fish can be played.

According to another aspect of the invention, a connection between a fishing line and a sinker line is provided by means that is remote from the lure so that nothing is visible to the fish being lured for a considerable distance ahead of the lure. The bait line strings rearwardly from the sinker line so that it creates very little turbulence, and when a monofilament line is used, the only thing observable to the fish is the lure.

According to a further aspect of the invention, a means is provided which is confined to the sinker line intermediate the sinker and at least a portion of the line leading to the surface, for releasably connecting the fishing line thereto; and so that the sinker or weight is the lowest most portion of the total apparatus and will drag along the bottom or other obstruction, while the lure or bait is positioned upwardly therefrom by a distance which prevents the lure or bait from becoming snagged. When the sinker or weight engages the bottom or other obstruction, it will be pulled up over the obstruction, and while doing so, cause the bait line to be similarly raised so that the bait or lure will clear the obstruction by a safe distance.

BRIEF DESCRIPTION OF THE DRAWINGS

FIG. 1 is a side elevational view of one embodiment of the release mechanism of the present invention, as assembled to a sinker line and a fishing line, and as used in the process of trolling at considerable depth; and FIG. 2 is a fragmentary side elevational view of the apparatus shown in FIG. 1 in its fishing line releasing condition.

DESCRIPTION OF THE PREFERRED EMBODIMENTS

While the various aspects of the invention may be otherwise embodied, they are shown and described herein as embodied in a sinker support that is positioned between the sinker and the bulk of its supporting line leading to the surface.

The sinker support 10 shown in the drawing comprises a single piece of wire which is bent adjacent one end to provide a loop 12 for connection to a sinker 14, and the end of its main body portion 16 provides a coil ring 18 having an internal opening 20 therein that is approximately 3 wire diameters. The wire at the top end of the main body portion 16 is bent into a loop 22 and is then twisted around the upper end of the main body portion 16 beneath the loop, as at 24, to anchor or secure the remaining end of the wire to the main body portion 16. The remaining end of the wire forms a bow-shaped spring member 26 which extends down along the main body portion 16, and which is sufficiently long, so that its lower end can be inserted in the central opening 20 of the ring 18. An enlargement 28 is provided somewhere in the center section of the bow-shaped spring member 26 for a purpose which will later be described. The enlargement 28 can be variously made, and in the embodiment shown is provided by a metal bead that is soldered to the wire which forms the bow-shaped spring member 26.

The sinker support 10 above described is used by attaching a sinker 14, which may be a window sash weight, by a suitable length of line 32 to the lower loop 12 of the sinker support 10. The upper loop 22 is fastened to a sinker support line 34 which leads to the surface, and is preferably wound upon a reel 36 to facilitate the depth adjustment of the sinker, and the retrieval of the sinker line 34. A lure 38, be it "artificial or live, is connected to a portion of a fishing line 40, which portion will hereafter be called a bait line 42 and which is secured to the portion of the spring member 26 below the enlargement 28. This is preferably done by a small loop 44 which loosely fits the spring 26, but is sufficiently small that it will not pass over the enlargement 28. The loop 44 is also connected to the fishing line 40 leading to the surface, and the loop 44 can conveniently be made by two half hitches or a tied portion of the fishing line 40. The bait line 42 preferably is devoid of harness, other than the lure, so that it will not attract the attention of the fish.

Where the line is a monofilament line having an index of refraction generally equal to that of the water, it will be substantially indistinguishable from the water, so that only the lure will be evident to the fish. The bait line 42 is preferably sufficiently long that the sinker support 10 will proceed past the fish while trolling by a sufficient distance that the fish will feel secure, and so that it will appear that the lure is following after the sinker support 10.

The length of line 32 may be adjusted to suit the condition of the fishing locale and may be relatively short when it is desired to fish close to the bottom. When fishing off of the bottom, the weight will hit any projection from the bottom, and will be pulled up over the projection by the sinker line 34. When this occurs, the bait line 42 will be pulled upwardly by a safe distance over the projection, so as to prevent the snagging of the lure. When fishing well clear of the bottom, the line 32 may be relatively long, so that it will be below the depth that is occupied by the fish which is being lured.

In the preferred embodiment, the ring 28 may comprise a plurality of coils which are substantially in engagement with each other, so that the end of the spring member 26 can become cocked between the coils to increase the force required to remove the end of the spring member from the ring 18. In some instances, the ring 18 will preferably be made from a separate piece of wire that is smaller in diameter than that of the bow-shaped spring member 26. Still other types of rings or retainers, closed or otherwise can be used.

It will now be seen that the fish to be lured has to strike the lure 38 from the rear at a velocity that is greater than that of the lure, and it is a natural inclination of the fish to dive downwardly and forwardly after the initial strike. When this occurs, the loop 44 will slide down the bow-shaped member 26 to a position that is stopped by the ring 18, at which position the tugging of the fish is practically incapable of pulling the spring member 26 from the ring 18. This makes the line go taut and automatically sets the hook, following which the fisherman starts to reel in the line 40, to pull the loop 44 upward against the enlargement 28, pull the lower end of the spring member 26 out of the ring 18 and allow the loop 44 to slip off of the end of this spring member 26, and thereby release the fishing line 40 from the sinker line 34. It will further be seen that should the fish try to run sideways with the lure, the tug on the bait line 42 will pull the bow-shaped spring member 26 from the ring 18 to automatically free the fishing line 40 from the sinker line 34, to thereafter allow the fisherman to play the fish independently of the weight of the sinker.

While most fish proceed downwardly after striking a lure, and the above-described embodiment has been described as resisting this movement, it will be seen that the installation of the support could be reversed to automatically set the hook by an upward strike of the fish.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:
1. A connection device for releasably securing a fish line to a weight line comprising: a nonseparating main body portion having connections for securing to other structure at opposite ends, a coil ring structure secured to said main body, and a bow shaped spring portion having a secured end and a nonsecured end, said secured end being nonseparably secured to said main body portion spaced from said ring structure by a distance less than the spacing of said secured and nonsecured ends with the nonsecured end being insertable in said ring and being removable therefrom by the bowing of said spring member.

2. The connection device of claim 1 including an enlargement on said spring member between its secured and nonsecured ends.

3. The connection device of claim 1 wherein said main body portion is made of wire.

4. The connection device of claim 3 wherein said spring member is also made of wire.

5. The connection device of claim 4 wherein said portions and connections are made integral from a single piece of wire.

6. The connection device of claim 4 wherein said coil ring is a helically coiled wire.

7. A connection device for releasably securing a fishing line to a weight line, said connection device including: a wire having a main body portion with loops at its opposite ends for attachment to a fishing line and to a weight line, a ring on one end of said main body portion, an elongated spring secured to the other end of said body portion and having a free end insertable in said ring, said spring having a fishing line and bait line connected thereto so as to pull said free end of said spring from said ring by a pull on the bait line generally at a right angle to said main body portion, or in the direction which the secured end of said spring is positioned from the other end of said main body portion, and to prevent said free end of said spring from being pulled out of the ring by a pull on the bait line in the direction in which said ring is positioned from said secured end of said spring.

8. A connection device for releasably securing a fish line to a weight line, said connection device including: body means having spaced lower and upper connections for respective attachment to a weight and to a weight line, elongated flexible first means attached to said body means for releasably attaching a fish line intermediate a baited end and a pole-attached end to said body means, said first means having a free end releasably held by a second means on said body means; said second means releasing said free end of said first means to release said fish line by a pull from said pole-attached end of said fish line, said first and second means functioning to prevent release of the fish line when the bait is pulled downwardly relative to said weight line.

References Cited
UNITED STATES PATENTS

| | | | |
|---|---|---|---|
| 2,494,620 | 1/1950 | Johnson | 43—42.19 |
| 3,229,408 | 1/1966 | Kohfield | 43—43.1 |
| 2,667,008 | 1/1954 | Baum | 43—43.15 |
| 2,731,758 | 1/1956 | Coe | 43—42.72 |
| 2,749,649 | 6/1956 | Fitzsimmons | 43—43.12 |
| 2,754,611 | 7/1056 | Riner | 43—42.72X |
| 2,786,296 | 3/1957 | Loebensteen | 43—43.12 |
| 2,858,637 | 11/1958 | Stark | 43—43.12 |

SAMUEL KOREN, Primary Examiner

D. J. LEACH, Assistant Examiner

U.S. Cl. X.R.

43—43.15